(12) United States Patent
Selvakumar et al.

(10) Patent No.: US 9,444,707 B2
(45) Date of Patent: Sep. 13, 2016

(54) MONITORING SYSTEM

(71) Applicant: Verizon Patent and Licensing Inc., Basking Ridge, NJ (US)

(72) Inventors: Sudharsan Selvakumar, Irving, TX (US); Enrique Ruiz-Velasco, Flower Mound, TX (US); Shafiq Kassam, Lewisville, TX (US); Ruchir Rodrigues, Dallas, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 217 days.

(21) Appl. No.: 13/734,780

(22) Filed: Jan. 4, 2013

(65) Prior Publication Data

US 2014/0195668 A1   Jul. 10, 2014

(51) Int. Cl.
*G06F 15/173* (2006.01)
*H04L 12/26* (2006.01)
*H04L 12/24* (2006.01)

(52) U.S. Cl.
CPC ......... *H04L 43/0817* (2013.01); *H04L 41/147* (2013.01)

(58) Field of Classification Search
USPC .................. 709/224, 200, 203, 219
See application file for complete search history.

(56) References Cited

U.S. PATENT DOCUMENTS

| 2009/0119778 A1* | 5/2009 | Bhuyan ......................... 726/25 |
| 2009/0257360 A1* | 10/2009 | Patel et al. .................... 370/252 |
| 2012/0079105 A1* | 3/2012 | Hoffman ...................... 709/224 |

\* cited by examiner

*Primary Examiner* — El Hadji Sall

(57) ABSTRACT

A server is configured to receive information regarding a plurality of issues associated with a plurality of client devices. The server is configured further to analyze the plurality of issues. The server is configured further to generate a plurality of parameters based on analyzing the plurality of issues; and send the plurality of parameters to the plurality of client devices.

20 Claims, 15 Drawing Sheets

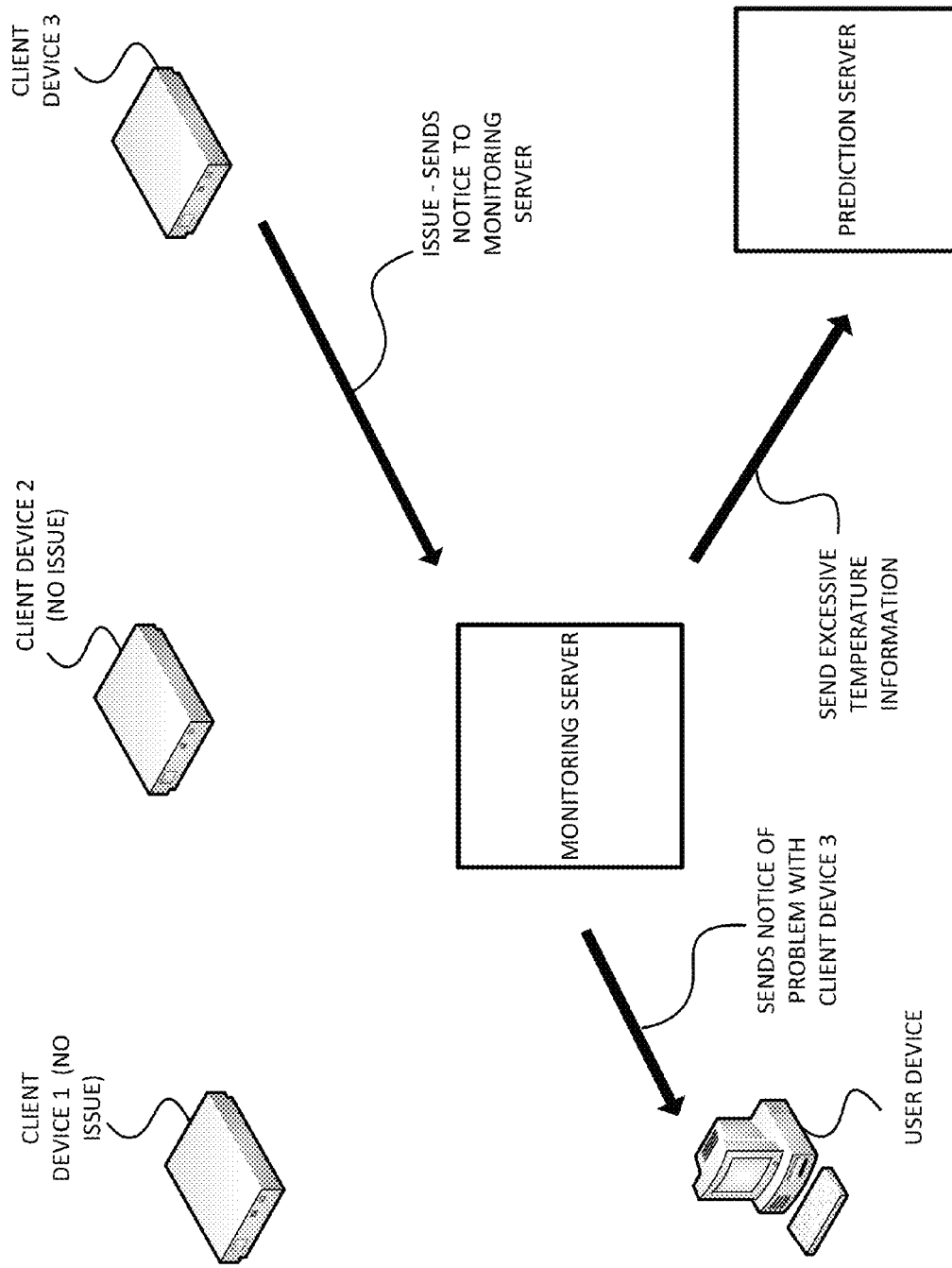

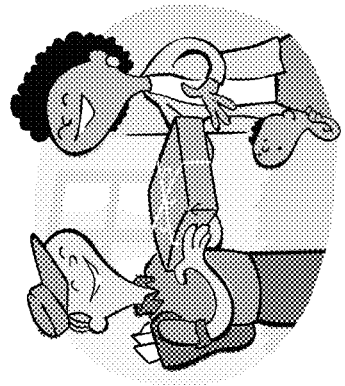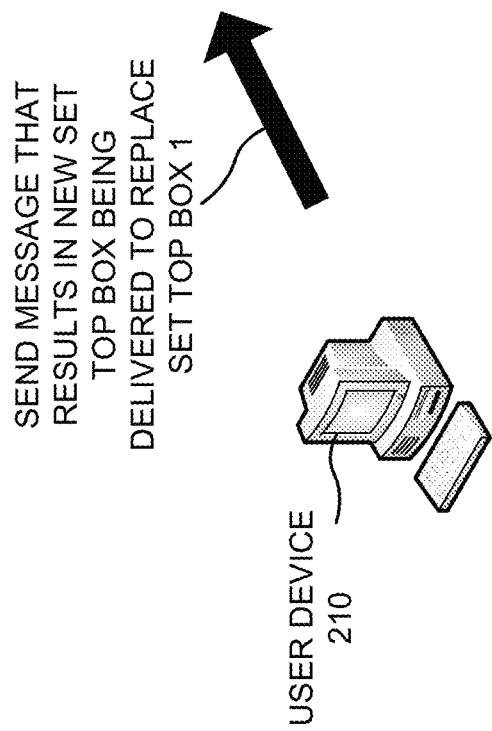
SEND MESSAGE THAT RESULTS IN NEW SET TOP BOX BEING DELIVERED TO REPLACE SET TOP BOX 1
USER DEVICE 210
FIG. 10C

MONITORING SYSTEM

BACKGROUND

A client device (e.g., a set top box) may receive content (e.g., video content, music content, etc.), via a network, from a content provider. The client device may send the content to another device (e.g., a television) so that a user of the client device may listen to or view the content.

BRIEF DESCRIPTION OF DRAWINGS

FIGS. 1A-1B are diagrams of an overview of an implementation described herein;

FIGS. 10A-10E are diagrams of example processes for detecting and resolving issues associated with a client device.

DETAILED DESCRIPTION OF PREFERRED EMBODIMENTS

The following detailed description refers to the accompanying drawings. The same reference numbers in different drawings may identify the same or similar elements.

Systems and/or methods described herein may permit a monitoring application, executing on a client device (e.g., a set top box), to monitor a condition of the client device (and associated hardware, such as an optical network terminal (ONT), broadband home router (BHR), etc.) by using a set of parameters stored by the monitoring application. Based on monitoring the condition of the client device, the monitoring application may detect issues (e.g., a video port not functioning) that may cause the client device to fail or cause the client device to function incorrectly (e.g., loss of audio, loss of video, etc.). The monitoring application may send the information (regarding the issue with the client device) to a monitoring server. The monitoring server may generate an action (e.g., send a technician to repair the client device, request a customer service representative to call a user, of the client device, ship a new client device to the user, etc.) based on the information. The monitoring server may send the information (associated with the issue) to a prediction server. The prediction server may use the information to update the parameters used for monitoring the client device. The prediction server may send the updated parameters to the monitoring application so that the monitoring application can more effectively detect issues associated with the client device. The prediction server may send the updated parameters to the monitoring server so that the monitoring server can more effectively generate actions to resolve issues associated with the client device.

Figure 1B:
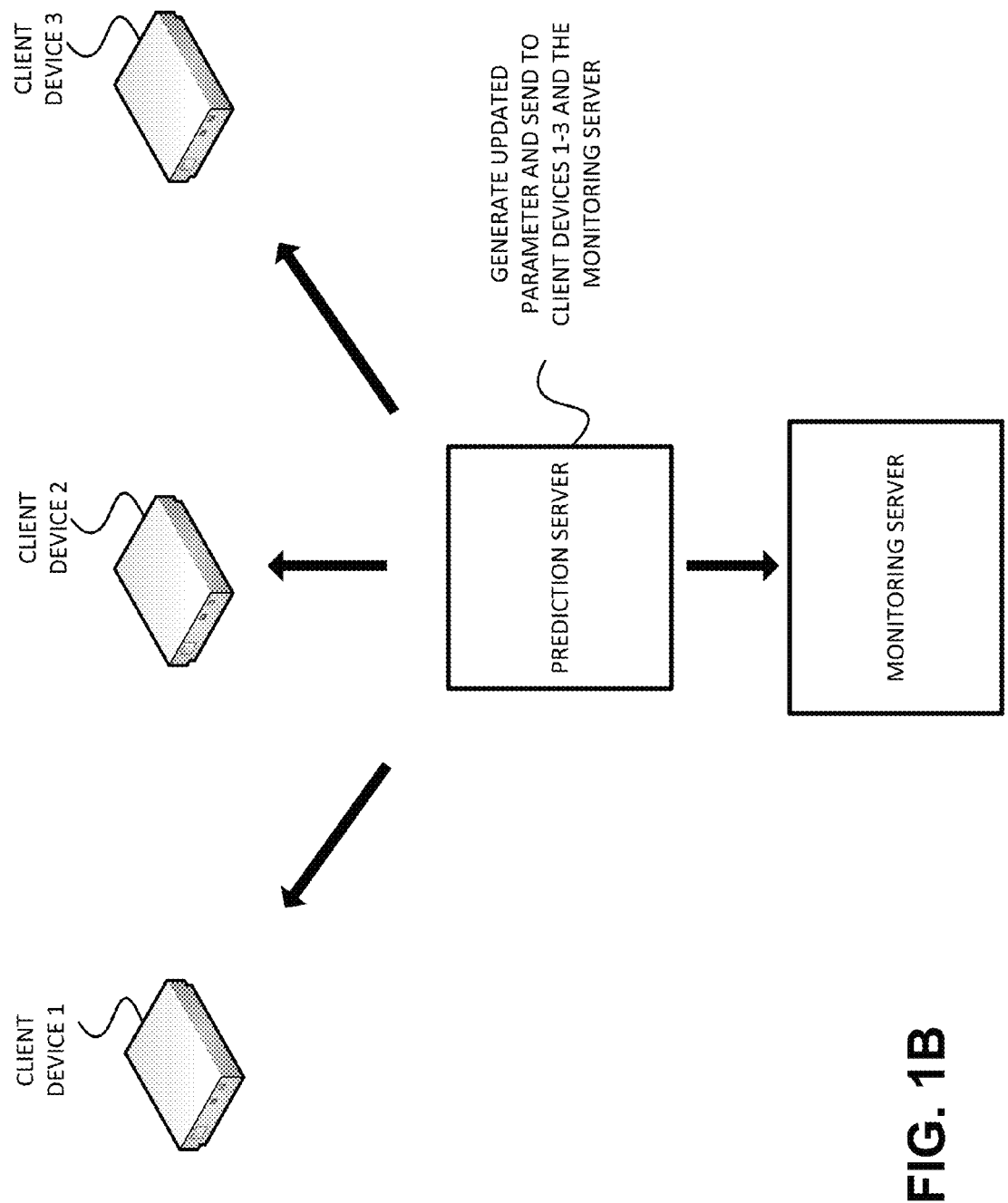

FIGS. 1A-1B are diagrams of an overview of an implementation described herein. FIG. 1A shows a client device 1, a client device 2, a client device 3, a monitoring server, a prediction server, and a user device. Assume that each of the client devices, shown in FIG. 1A, are associated with different customers of a network service provider. Assume that the network service provider provides television programming content (from a content provider) to the client devices over a network (operated by the network service provider). Assume that client device 1, client device 2, and client device 3 provide the television programming content to corresponding televisions. Assume that the client devices each have a monitoring application.

As shown in FIG. 1A, the monitoring applications executing on client device 2 and client device 3 have not detected any issues on either client device and do not send any notifications to the monitoring server. However, the monitoring application for client device 3 may detect an issue (e.g., the temperature of client device 3 is greater than a threshold temperature, the hard drive of client device 3 is not functioning correctly, etc.) with client device 3. The monitoring application, for client device 3, may send the information regarding the issue to the monitoring server.

The monitoring server may receive the information from the monitoring application, executing on client device 3, and may determine that an action (e.g., sending a new client device, sending a technician to the location of client device 3, forcing a reboot of client device 3 etc.) be taken regarding the potential issue with client device 3.

As shown in FIG. 1A, the monitoring server may send a notification to the user device. The user, of the user device, may view the notification displayed on the user device. The notification may indicate the action needed to be taken regarding client device 3.

Additionally, the monitoring server may send the information regarding the potential issue with client device 3 to the prediction server. The prediction server may analyze the information regarding the issue with client device 3. The prediction server may generate updated parameters based on the received information. The prediction server may send updated parameters to the monitoring server and to the monitoring applications executing on the client devices, as shown in FIG. 1B. The monitoring server may use the updated parameters to determine the appropriate action to be taken based on the information received from client device 3. The monitoring applications, on client devices 1, 2 and 3, may use the updated parameters to determine whether a potential issue exists with the respective client device.

As a result, issues associated with a client device may be detected and/or resolved before the issue causes the client device to stop functioning or to cause the condition of the client device to worsen. Updating the parameters that are used to detect and/or resolve issues may permit the network service provider to provide an increased level of customer service by ensuring that a customer of the network service provider has a functioning client device.

Figure 2:
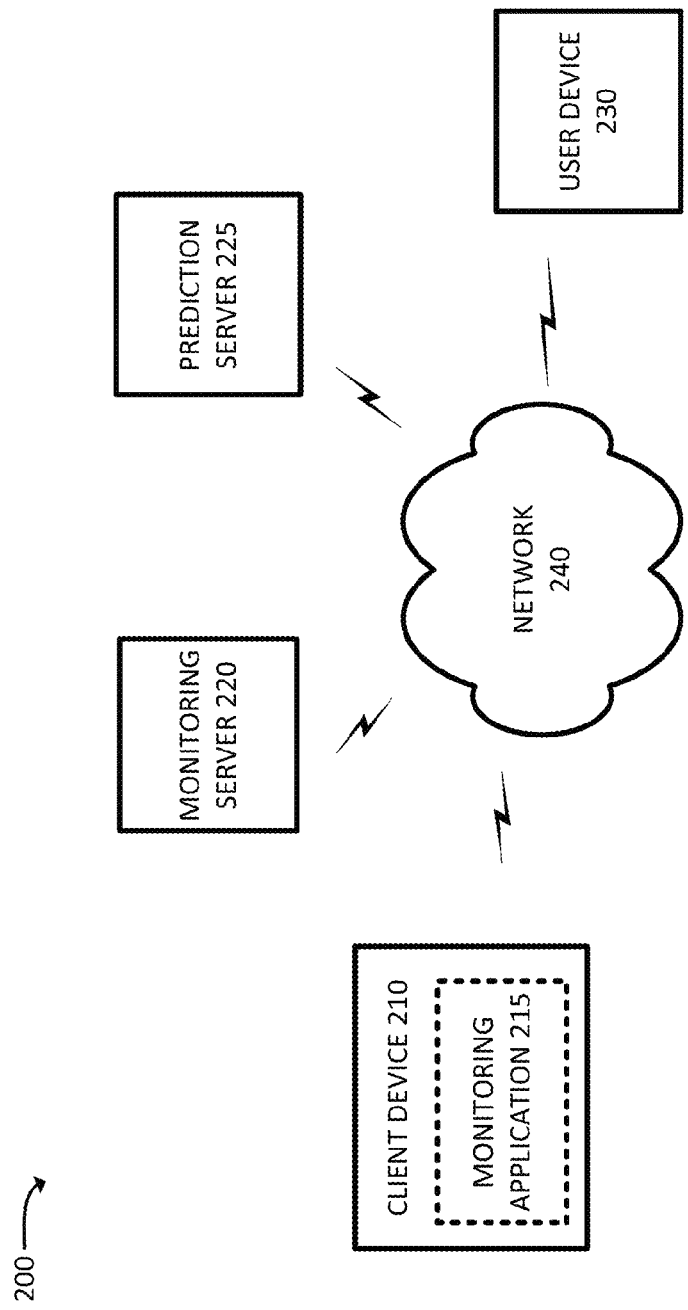
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a monitoring application 215, a monitoring server 220, a prediction server 225, a user device 230, and a network 240.

Client device 210 may include a device that is capable of receiving different types of content from a network service provider associated with a network (e.g., network 240). For example, client device 210 may include a set-top box, a gaming system, a television, a cable card, a digital video recorder (DVR), a TV tuner card, or any other device that is capable of outputting audio and/or video media including music, images, television content, movies, and/or other types of information.

Monitoring application 215 may include an application that is capable of monitoring a condition of client device 210; detecting issues associated with client device 210; resolving issues associated with client device 210; and/or sending notifications regarding issues to monitoring server 220. Monitoring application 215 may store parameters that are used for monitoring a condition of client device 210. The parameters may be updated by receiving updated parameters from prediction server 225.

Monitoring server 220 may include one or more server devices that are capable of receiving information from one or more client devices 210 and using the information to determine an appropriate action (e.g., ship a new client device 210, send a technician to repair client device 210, force client device 210 to reboot, send a message to client device 210 to assist a user of client device 210 to resolve an issue, etc.) to resolve an issue with a particular client device 210. Monitoring server 220 may store parameters that monitoring server 220 may use to determine the appropriate action.

Prediction server 225 may include one or more server devices that are capable of receiving information from monitoring server 220 and using that information to generate parameters that are used to detect and resolve issues associated with client devices 210. Prediction server 225 may send these parameters to update the parameters used by monitoring application 215 and monitoring server 220. In some implementations, prediction server 225 and monitoring server 220 may be implemented within the same one or more servers.

User device 230 may include any user device that is capable of communicating with a network (e.g., network 240). For example, user device 230 may include a radiotelephone, a personal digital assistant (PDA) (e.g., that can include a radiotelephone, a pager, Internet/intranet access, etc.), a workstation, a laptop, a tablet computer, or any other type of user device.

Network 240 may include one or more wired and/or wireless networks. For example, network 240 may include a cellular network, a public land mobile network (PLMN), a second generation (2G) network, a third generation (3G) network, a fourth generation (4G) network, a fifth generation (5G) network, and/or another network. Additionally, or alternatively, network 240 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, a long term evolution (LTE) network, and/or a combination of these or other types of networks.

The quantity of devices and/or networks, illustrated in FIG. 2 is provided for explanatory purposes only. In practice, there may be additional devices and/or networks; fewer devices and/or networks; different devices and/or networks; and differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
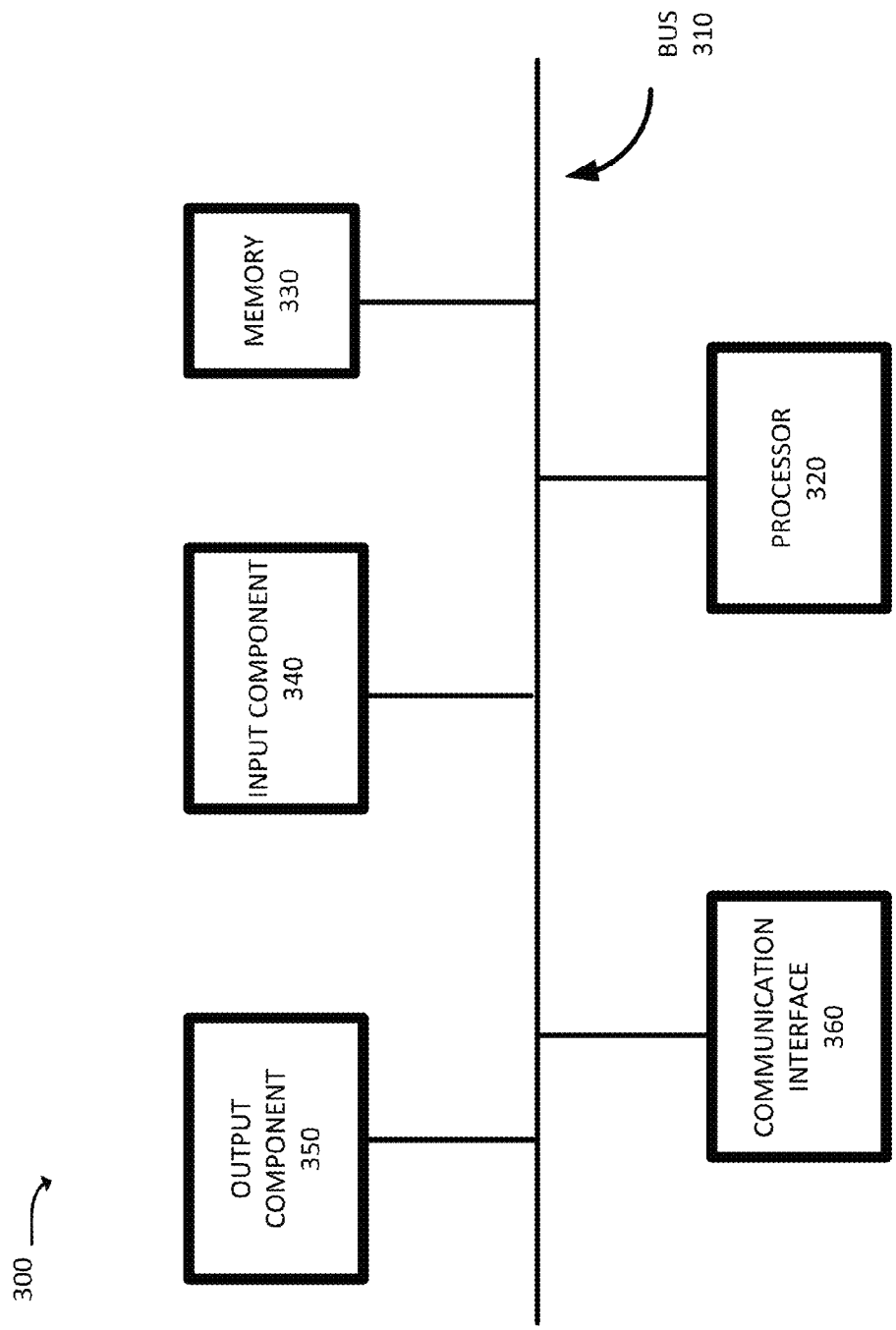
FIG. 3 is a diagram of example components of one or more devices of FIGS. 1A, 1B, and 2.

FIG. 3 is a diagram of example components of a device 300. Device 300 may correspond to client device 210, monitoring server 220, prediction server 225, and/or user device 230. Additionally, or alternatively, each of client device 210, monitoring server 220, prediction server 225, and/or user device 230 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic (e.g., a field programmable gate array (FPGA), or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320.

Input component 340 may include a component that permits a user to input information to device 300, such as a keyboard, a keypad, a button, a microphone, a switch, etc. Output component 350 may include a component that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communication interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with network 240 and/or devices connected to network 240.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include memory space within a single physical storage device or memory space spread across multiple physical storage devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
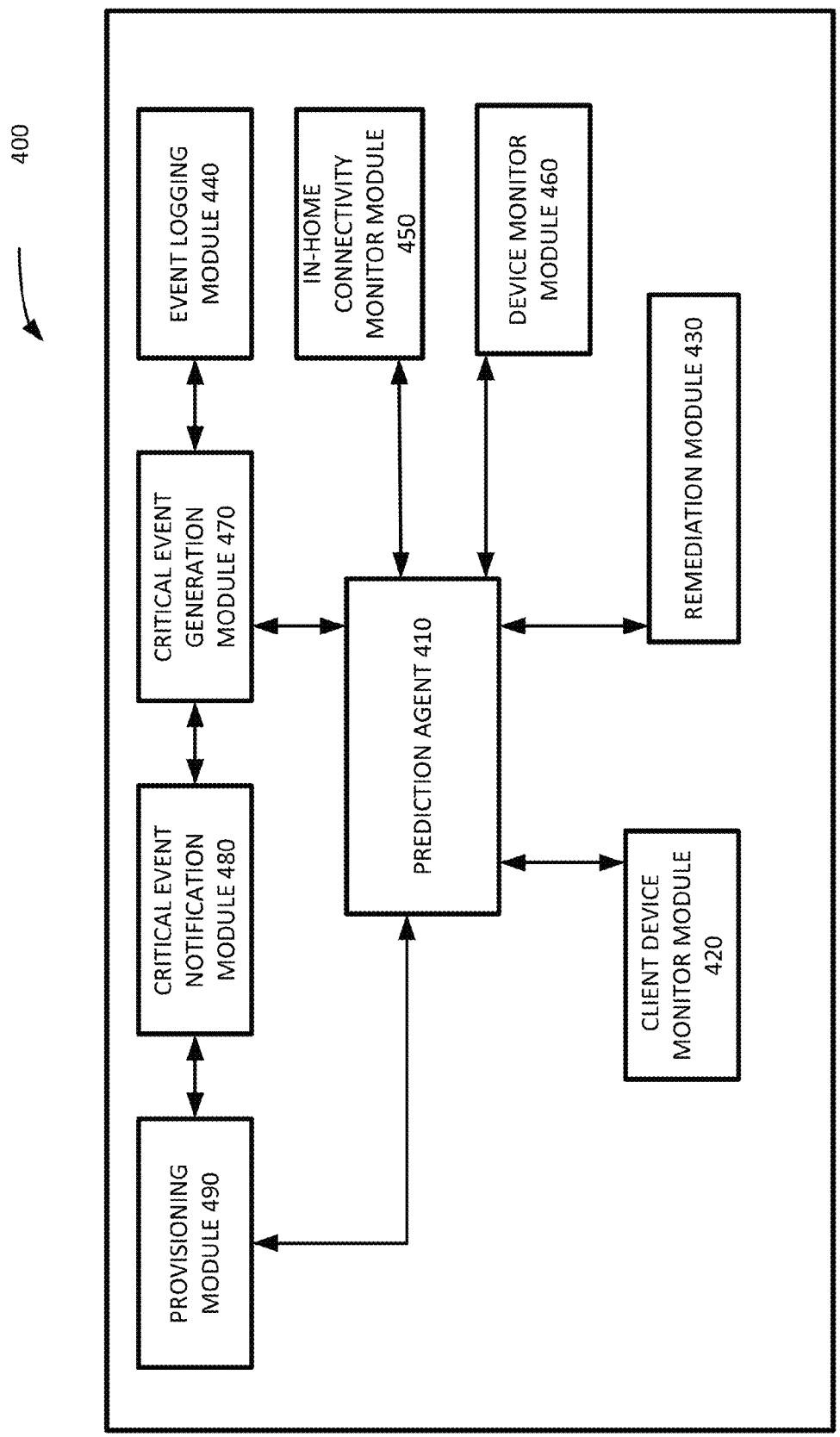
FIG. 4 is a diagram of an example functional diagram of a client device.

FIG. 4 is a diagram of example functional components of a device 400 that may correspond to client device 210. As illustrated, device 400 may include a prediction agent 410, a client device monitor module 420, a remediation module 430, an event logging module 440, an in-home connectivity monitor module 450, a device monitor module 460, a critical event generation module 470, a critical event notification module 480, and a provisioning module 490. Each of functional components 410-490 may be implemented using one or more components of device 300 or by using one or more devices 300. One of the functional components in FIG. 4 may perform one or more tasks described as being performed by another functional component of FIG. 4.

Prediction agent 410 may store parameters that are used to detect issues with client device 210 and/or other devices associated with client device 210. The parameters may be associated with monitoring different components of client device 210. Prediction agent 410 may receive information regarding the different components of client device 210 from client device monitor module 420. The different components may include a quadrature amplitude modulation tuner (QAM tuner), a multiplexer, a cable card, a demultiplexer, a video/audio decoder, a transcoder, a tuner, a hard drive, and/or another component of client device 210. Prediction agent 410 may detect temperature ranges, signal to noise ratios, bit-stream rates, mean time between failures, buffer overflows, multimedia over coaxial (MoCA), and/or other parameters that are associated with the different components of client device 210.

Additionally, prediction agent 410 may store parameters that are used to detect issues with other devices and/or connections associated with client device 215. Prediction agent 410 may receive information about the other devices and/or the connections from in-home connectivity monitor module 450 and/or device monitor module 460. For example, the parameters may be associated with monitoring an ONT, a BHR, an Internet Protocol (IP) client (e.g., a router, a switch, etc.), a splitter, an Ethernet connection cable, a coaxial connection cable, and/or another connection and/or another device.

Prediction agent 410 may determine whether a particular parameter satisfies a threshold associated with the particular parameter. For example, prediction agent 410 may store a threshold associated with a temperature of client device 210 (e.g., the temperature, for example, may not exceed the threshold temperature). Prediction agent 410, may, for example, store a time threshold associated with the amount of time associated with a particular issue (e.g., a buffer overflow associated with a video decoder may not occur for greater than five minutes). If the parameter satisfies the threshold, then prediction agent 410 may communicate with critical event generation module 470 to generate a message indicating that an issue exists with client device 210 that needs to be resolved.

Client device monitor module 420 may receive information associated with client device 210. The information may be associated with the condition of various components of client device 210. Client device monitor module 420 may send the information to prediction agent 410 so that prediction agent 410 may determine whether there is an issue with client device 210.

Remediation module 430 may resolve an issue associated with client device 210 and/or another device and/or connection associated with client device 210. Remediation module 430 may resolve the issue by using an instruction from prediction agent 410 regarding how to resolve the issue. For example, remediation module 430 may reboot client device 210 based on determining that rebooting client device 210 may resolve the issue. Additionally, or alternatively, remediation module 430 may generate a message for a user of client device 210 to reboot client device 210. Rebooting client device 210 may require the user to physically turn off (or power down) client device 210 and turn client device 210 back on (or power client device 210 back up). Additionally, or alternatively, remediation module 430 may repair a file within the software being used by client device 210 to resolve the issue.

Event logging module 440 may receive information from a head-end server that provides content to client device 210. A head-end server may be associated with a content provider that is providing content, such as video content, audio content, and/or other types of content to client device 210. For example, event logging module 440 may store information about content being sent to client device 210 from the head-end server. This information may be used to determine that client device 210 is receiving content from the head-end server. If content is not being sent from the head-end server, then event logging module 440 may notify critical event generation module 470 to generate a notification that client device 210 is not receiving content from the head-end server.

In-home connectivity monitor module 450 may receive information associated with connections between client device 210 to other devices, located at the same location as client device 210. For example, in-home connectivity monitor module 450 may monitor different connections (e.g., Ethernet cables, coaxial cables, etc.) used to connect client device 210 with other devices. In-home connectivity monitor module 450 may send the information to prediction agent 410. Prediction agent 410 may detect whether an issue exists with one or more of the connections between client device 210 and the other devices.

Device monitor module 460 may receive information associated with the other devices associated with client device 210. For example, device monitor module 460 may monitor different types of devices (ONT, BHR, IP client, television, etc.) that are connected to client device. Device monitor module 460 may receive condition information from the other devices based on whether client device 210 is receiving content and/or information (e.g., BHR is sending information to client device 210) form the other devices. Device monitor module 460 may send the information to prediction agent 410 and prediction agent 410 may detect whether an issue exists with any of the other devices associated with client device 210.

Critical event generation module 470 may generate a notification (based on prediction module 410 determining that there is an issue or a potential issue) that there may be an issue with client device 210 and/or an issue with one or more of the other devices and/or connections associated with client device 210.

Critical event notification module 480 may receive the notification from critical event generation module 470 and may send the notification to monitoring server 220. In some example implementations, critical event notification module 480 may encrypt the notification.

Provisioning module 490 may receive updated parameters from prediction server 225. Provisioning module 490 may provision the updated parameters so that the updated parameters can be used by prediction agent 410. For example, provisioning module 490 may receive the updated parameters in an encrypted message and provisioning module 490 may decrypt the message so that the updated parameters may be used by prediction agent 410.

Figure 5:
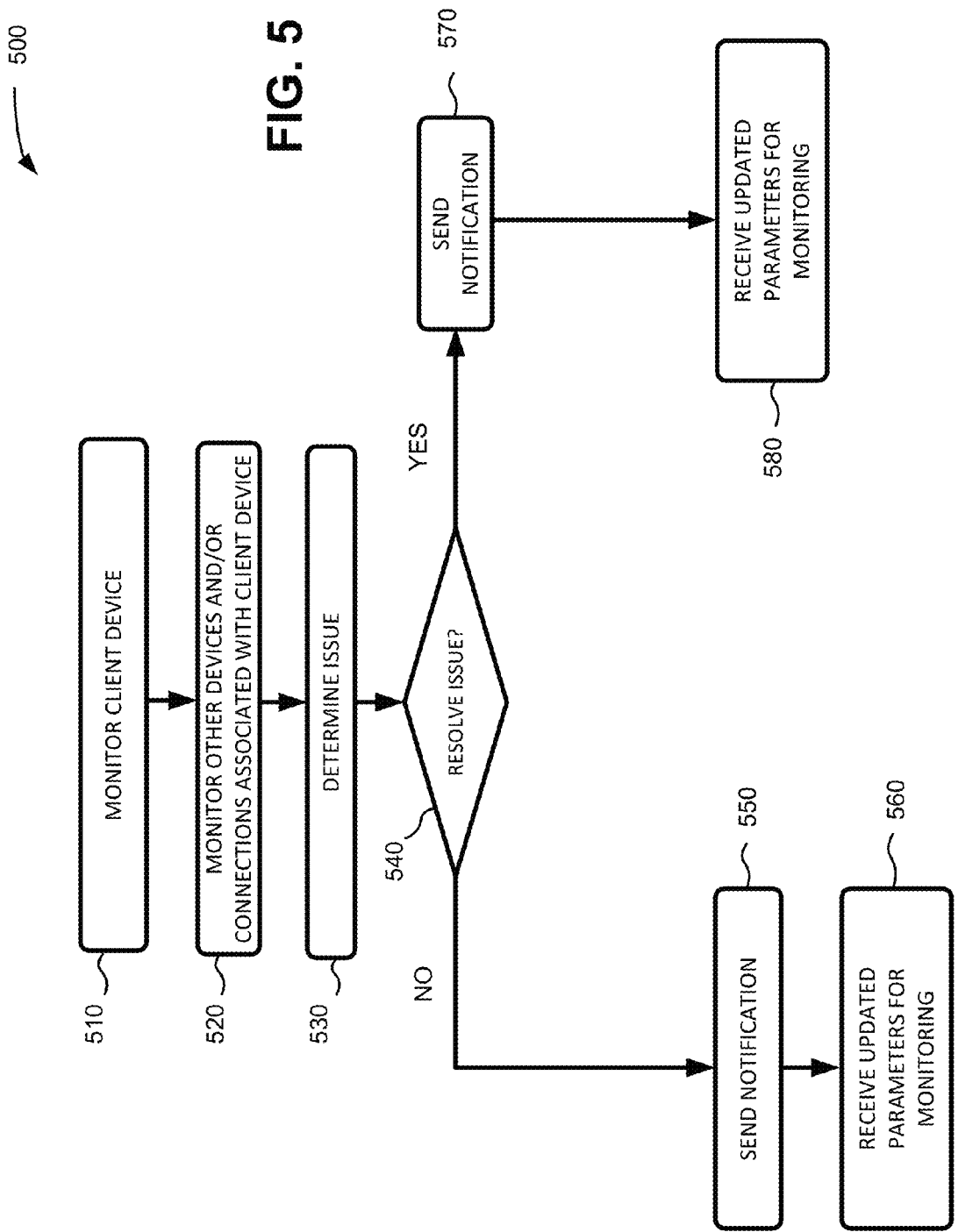
FIG. 5 is a flow chart of an example process for resolving issues associated with a client device.

FIG. 5 is a flow chart of an example process 500 for resolving issues with a client device. In one implementation, process 500 may be performed by client device 210. In another example implementation, one or more blocks of process 500 may be performed by one or more other devices, such as monitoring server 220 and/or prediction server 225.

Process 500 may include monitoring a client device (block 510). For example, monitoring application 215, executing on client device 210, may monitor a condition of client device 210. Monitoring application 215 may be configured with a set of parameters that are used to monitor the condition of client device 210, as described with regard to FIG. 4. For example, the condition may be the temperature level of client device 210, the amount of information being sent to client device 210, a buffering level associated with client device 210, SNR levels, and/or another type of information.

Process 500 may include monitoring other devices associated with the client device (block 520). For example, monitoring application 215 may monitor a condition of other devices and connections associated with client device 210, as described with regard to FIG. 4.

Process 500 may include determining an issue associated with the client device (block 530). For example, monitoring application 215 may determine (as described with regard to FIG. 4) an issue with client device 210 or another devices or connection associated with client device 210. Monitoring application 215 may determine whether to resolve the issue (described with regard to FIG. 4). For example, monitoring application 215 store information, such as a table that includes an issue and an action to be taken by monitoring application 215. For example, the table may include information that if the temperature exceeds 92 degrees Celsius, monitoring application 215 may not be able resolve the issue. Alternatively, the table may include information that if there is no QAM video, monitoring application 215 may be able to resolve the issue by repairing, for example, a video port associated with monitoring application 215.

If monitoring application 215 cannot resolve the issue (block 540—NO), then process 500 may include sending a notification (block 550). For example, monitoring application 215 may generate and send a notification (as described with regard to FIG. 4) to monitoring server 220. Monitoring server 220 may use the notification to determine the type of action that will resolve the issue, such as shipping a new client device 210 to the user, having a customer service representative contact the user of client device 210, issuing some kind of resolution command to client device 210, and/or another type of action.

Monitoring server 220 may send the notification to prediction server 225. Prediction server 225 may use the information in the notification to update parameters that are used to detect issues associated with client devices 210. Prediction server 225 may receive information from multiple client devices 210 and prediction server 225 may generate updated parameters based on the information. Prediction server 225 may send the updated parameters to client devices 210 so that the client devices 210 can improve their monitoring operations.

Process 500 may include receiving updated parameters for monitoring (block 560). For example, monitoring application 215 may receive an updated parameter (from prediction server 225) to determine whether an issue exists with client device 210. The updated parameter may change a threshold. For example, the updated parameter may change a threshold associated with how monitoring application 215 monitors the condition of client device 210. For example, an updated parameter may change a threshold associated with monitoring the QAM signal-to-noise ratio (SNR) value. Additionally, or alternatively, the updated parameter may add a new condition for monitoring application 215 to monitor. For example, the updated parameter may permit monitoring application 215 to monitor the temperature of the hard drive of client device 210.

If monitoring application 215 resolves the issue (block 540—YES), then process 500 may include sending a notification (block 570). For example, monitoring application 215 may send a notification to monitoring server 220 that monitoring application 215 resolved an issue with client device 210. The notification may include information regarding the issue with client device 210, the conditions related to the issue, and how monitoring application 215 resolved the issue.

Monitoring server 220 may determine that even though monitoring application 215 has resolved the issue, an additional action (e.g., ship a new client device 210 to the user of client device 210, send a technician to the user's location, request a customer service representative to contact the user, etc.) is required based on receiving the notification from monitoring application 215. Monitoring server 220 may determine, based on analyzing (with historical information stored by monitoring server 220) the notification that the issue (resolved by monitoring application 215) may occur within a particular period of time (e.g., in the next 10 days, 20 days, 30 days, etc.).

Monitoring server 220 may send the notification to prediction server 225. Prediction server 225 may use the information in the notification to update parameters that are used to detect issues associated with client devices 210. Prediction server 225 may receive information from multiple client devices 210 and prediction server 225 may generate updated parameters based on the information. Prediction server 225 may send the updated parameters to client devices 210 so that the client devices 210 can improve their monitoring operations.

Process 500 may include receiving updated parameters (block 580). For example, monitoring application 215 may receive an updated parameter (from prediction server 225) to be used to monitor issues with client device 210. The updated parameter may change a threshold associated with how monitoring application 215 monitors client device 210. For example, an updated parameter may change a threshold associated with monitoring the temperature of client device 210 from 97 degrees Celsius to 94 degrees Celsius. Additionally, or alternatively, the updated parameter may add a new condition for monitoring application 215 to monitor.

For example, the updated parameter may permit monitoring application 215 to monitor the temperature of a decoder inside of client device 210.

While a series of blocks has been described with regard to FIG. 5, the blocks and/or the order of the blocks may be modified in other implementations. Further, non-dependent blocks may be performed in parallel.

Figure 6:
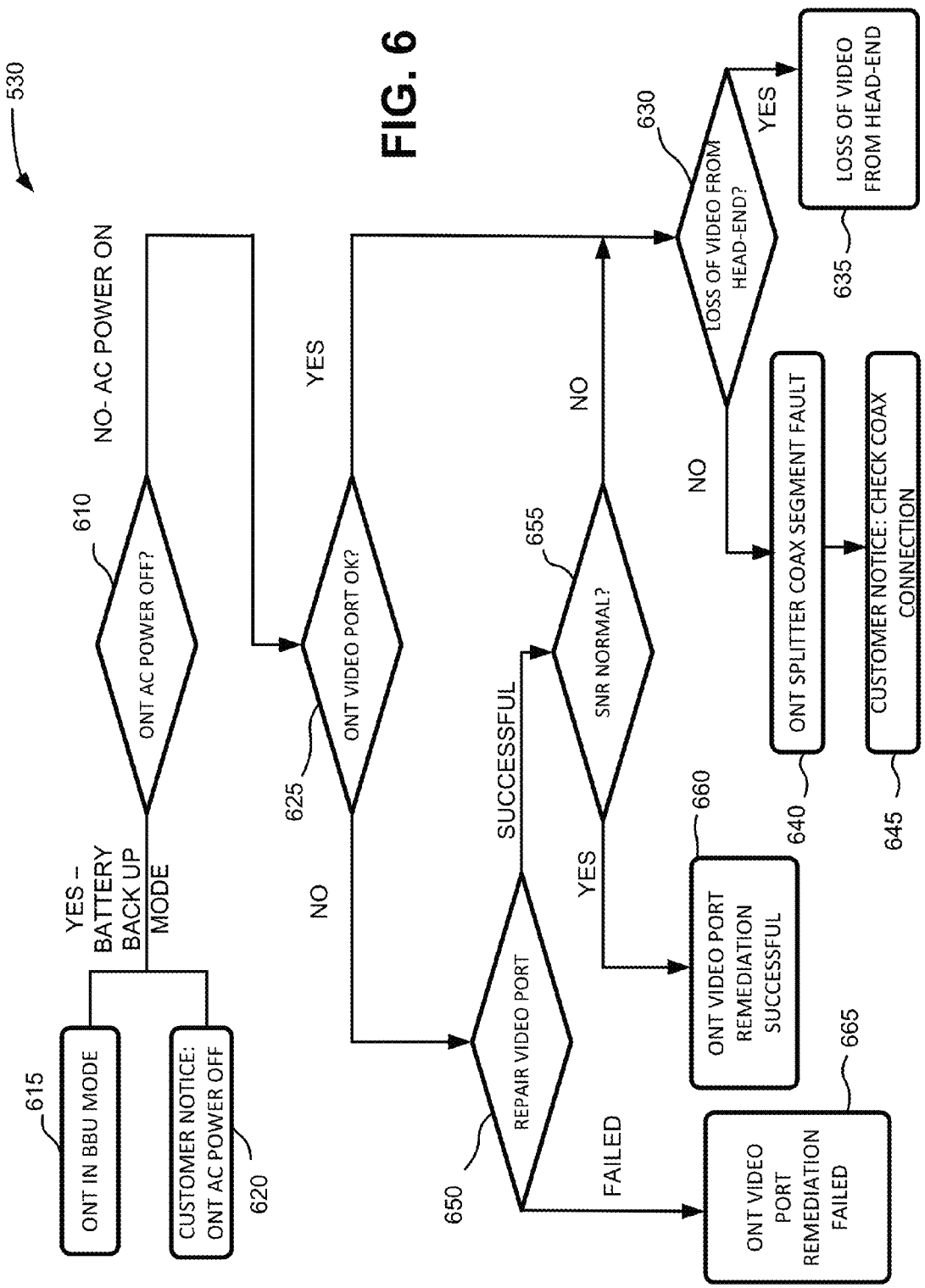
FIG. 6 is a flow chart of an example process for determining an issue associated with a client device.

FIG. 6 is a flow chart of an example process 600 for determining an example issue with client device 210, described with regard to block 530 in FIG. 5. Process 600 may be associated with determining an issue with an ONT associated with client device 210. Assume that monitoring application 215 may determine that there is no QAM video and may determine whether the reason for no QAM video is that the ONT power is off.

If the ONT power is off (block 610—YES), then process 600 may include sending a message that the ONT is in battery back-up mode (block 615). For example, monitoring application 215 may send a message to monitoring server 220 that the ONT for client device 215 is in battery back-up mode. Additionally, monitoring application 215 may send a message to the user of client device 210 (e.g., via a television) that the ONT is in battery back-up mode (block 620).

If the ONT power is not off (block 610—NO), then process 600 may include determining whether the ONT video port is functioning (block 625). If the ONT video port head in functioning (block 625—YES), then process 600 may include determining whether there is a loss of video from a head-end (block 630). The head-end may be a facility that transmits content, such as a cable television head-end that receives television content and distributes the television content through network 240.

If the loss of video is from the head-end (bock 630—YES), then process 600 may including determining that the loss of video from the head-end is the reason why there is no QAM video (block 635). Monitoring application 215 may send a notification (described with regard to FIGS. 4 and 5), to monitoring server 220, that indicates that the loss of video is due to the loss of video from the head-end.

If the loss of video is not from the head-end (block 630—NO), then process 600 may include determining that the issue is the ONT splitter coaxial segment (block 640) and providing a notice to the user, of client device 210, to check the splitter coaxial segment (block 645). Monitoring application 215 may send a message to monitoring server 220 that there is an issue with the ONT splitter coaxial segment. Monitoring server 220 may, for example, generate a message for a customer service representative to contact a user of client device 210 to follow-up to see if the ONT splitter coaxial segment has been resolved. Additionally, monitoring application 215 may send a message to the user of client device 210 (e.g., via a television) for the user to check the coaxial connection.

If the ONT video port is not functioning (block 625—NO), then process 600 may include repairing the video port (block 650). For example, monitoring application 215 may determine that rebooting the device may repair the video port. Thus, monitoring application 215 may cause client device 210 to reboot.

If repairing the video port is successful (block 650—YES), then process 600 may include determining whether the signal-to-noise ratio (SNR) is normal (block 655). For example, monitoring application 215 may store information regarding a threshold for SNR. If the SNR is less than the threshold, then the SNR is not normal.

If the SNR is normal (block 655—YES), then process 600 may include determining that the video port repair is successful (block 660). Monitoring application 215 may send a notification to monitoring server 220 regarding the video port repair. Monitoring server 220 may, for example, generate a message for a customer service representative to contact the user of client device 210 to follow-up to see if the ONT video port has been resolved.

If the SNR is not normal (block 655—NO), then process 600 may include determining whether the issue is associated with a loss of video from the video head-end (block 630 as described above).

If repairing the video port fails (block 650—FAILED), then process 600 may include determining that the video port repair failed (block 665). Monitoring application 215 may send a notification to monitoring server 220 regarding the video port repair. Monitoring server 220 may, for example, generate a message for a customer service representative to contact the user of client device 210 to assist the user (e.g., providing instructions to the user, informing the user that a technician is being sent to the user's residence, etc.).

While a series of blocks has been described with regard to FIG. 6, the blocks and/or the order of the blocks may be modified in other implementations. Further, non-dependent blocks may be performed in parallel.

Figure 7:
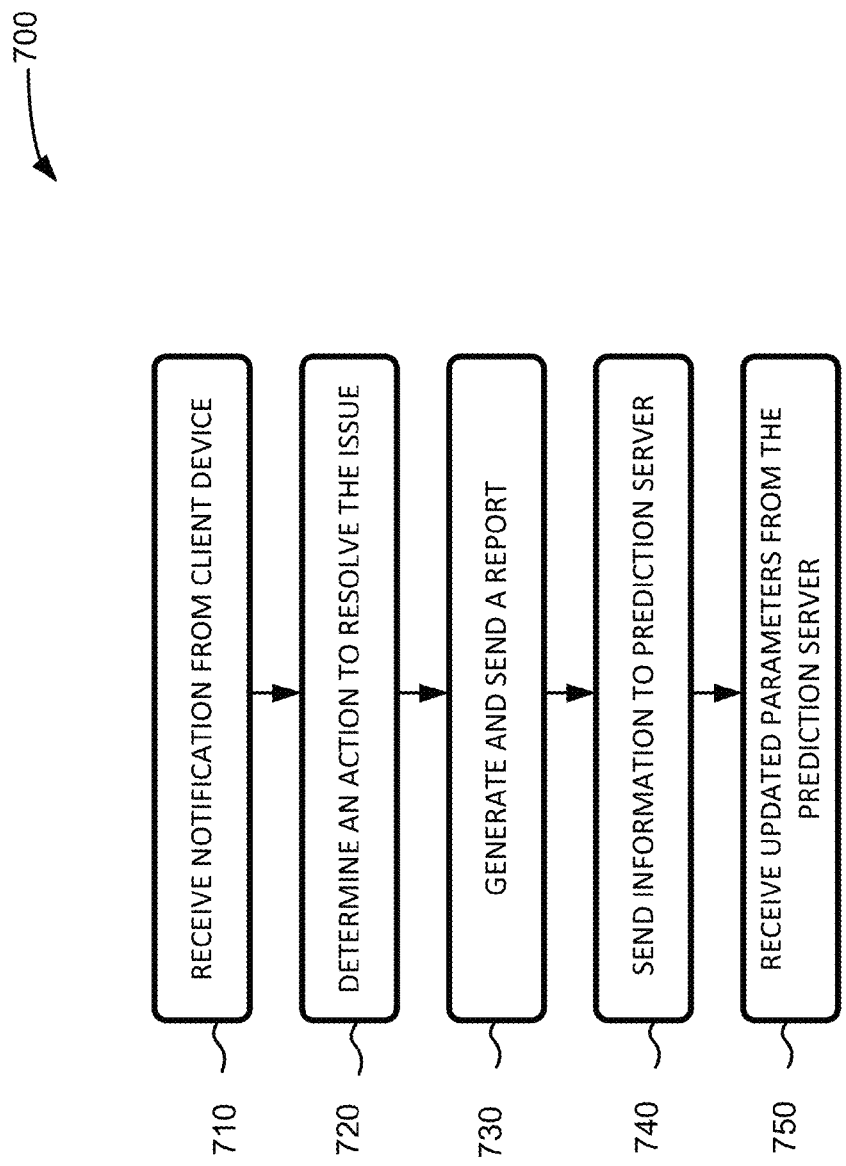
FIG. 7 is a flow chart of an example process for resolving issues with a client device.

FIG. 7 is a flow chart of an example process 700 for resolving an issue with a client device. In one implementation, process 700 may be performed by monitoring server 220. In another example implementation, one or more blocks of process 700 may be performed by one or more other devices, such as client device 210 and/or prediction server 225.

Process 700 may include receiving a notification from a client device (block 710). For example, monitoring server 220 may receive a notification from client device 210 that an issue exists regarding client device 210 as described with regard to block 550 or block 570 in FIG. 5. The notification may include information regarding the issue with client device 210 and/or another device connected to client device 210. Additionally, the notification may include information regarding any actions taken by monitoring application 215 in resolving the issue with client device 210 and/or the other device.

Process 700 may include determining an action to resolve the issue (block 720). For example, monitoring server 220 may determine an action needed to resolve the issue associated with client device 210. Monitoring server 220 may have stored information regarding the action to be taken based on the information received from client 210. For example, the notification may include information regarding a faulty tuner, a video decoder buffer overflow, a transcoder buffer overflow, a hard drive corruption, a display interface issue, and/or another issue.

Monitoring server 220 may determine an action to resolve the issue. The action by monitoring server 220 may include having a customer service representative contact (e.g., via telephone, email, etc.) the user (of client device 210) and provide instructions to the user that will resolve the issue with client device 210; sending a technician to the user's location and having the technician resolve the issue with client device 210; and/or another type of action to replace or repair client device 210.

Process 700 may include generating and sending a report (block 730). For example, monitoring server 220 may generate a report based on the notification received from client device 210 and from other client devices 210. The report may include an analysis of how many client devices 210, over a period of time (e.g., per week, per month, per every four months), failed for a particular reason. For example, the report may indicate that 20% of client device 210 failures are due to excessive temperature readings that are associated with the hard drive in client device 210. The report, for example, may also include an analysis of the amount of resources (e.g., wages, hours, etc.) spent on customer service representatives and technicians (who work for the network service provider or a contractor for the network service provider) to resolve issues dealing with client devices 210. Additionally, the report may include graphs, charts, tables, and/or other features that may be used to analyze the issues associated with client devices 210 that are being used through the network.

The report may be used to reduce costs by determining more efficient processes (that cost less and/or use less human resources) to handle issues with client devices 210. The report may also be used to train employees on how to handle issues with client devices 210 (e.g., training of customer service representatives and/or technicians to ask the user questions that may help to resolve an issue without having to provide the user with a new client device 210).

Monitoring server 220 may send the report to user device 230. A user (e.g., an employee of the network service provider) of user device 230 may use the report to determine the action needed to be taken to resolve the issue. The user of user device 230 may communicate (e.g., via telephone, email, intranet, etc.) with other employees of the network service provider to implement the action needed to be taken to resolve the issue.

Process 700 may include sending information to a prediction server (block 740). For example, monitoring server 220 may send the information received from client device 210 to prediction server 225. The information may be used by prediction server 225 to update parameters used by client device 210 and monitoring server 220.

Process 700 may include receiving updated parameters from the prediction server (block 750). For example, monitoring server 220 may receive updated parameters from prediction server 225. The updated parameters may be used by monitoring server 220 to determine the type of action needed to be taken to resolve an issue associated with client device 210.

While a series of blocks has been described with regard to FIG. 7, the blocks and/or the order of the blocks may be modified in other implementations. Further, non-dependent blocks may be performed in parallel.

Figure 8:
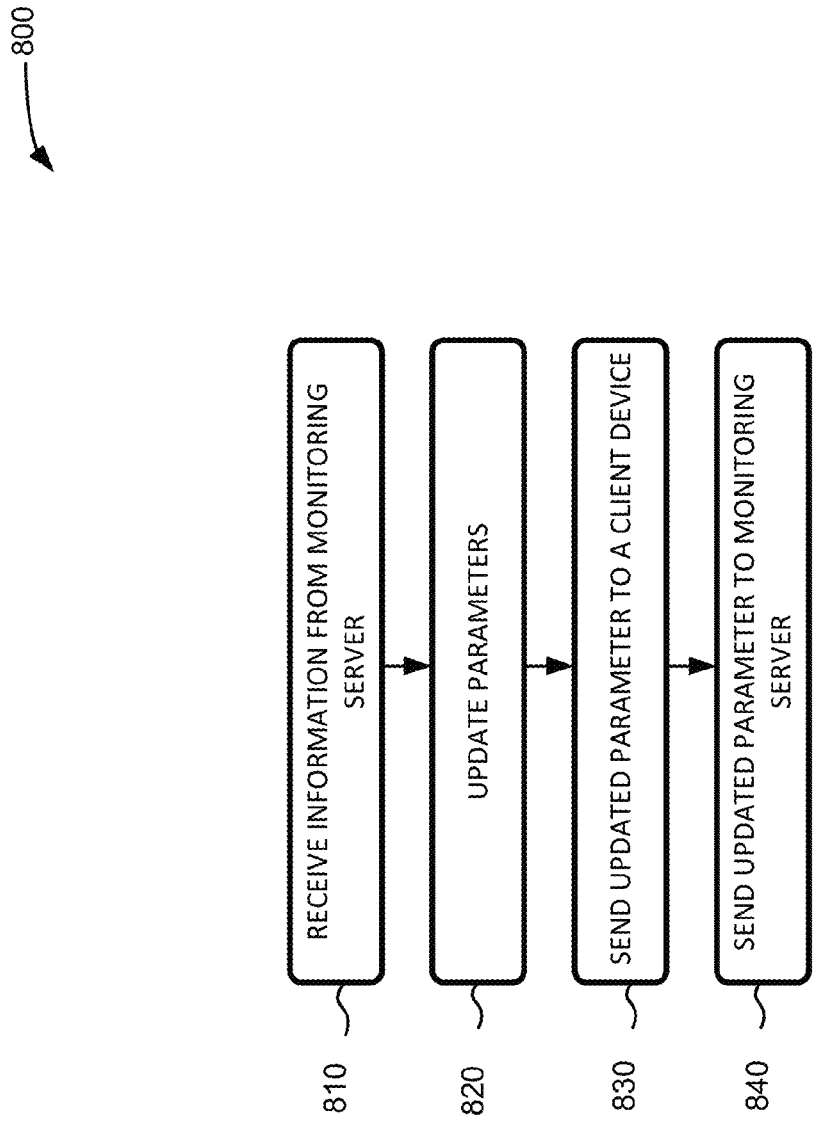
FIG. 8 is a flow chart of an example process for determining parameters used for monitoring a condition of a client device.

FIG. 8 is a flow chart of an example process 800 for determining parameters used for monitoring a condition of a client device. In one implementation, process 800 may be performed by prediction server 225. In another example implementation, one or more blocks of process 800 may be performed by one or more other devices, such as client device 210 and/or monitoring server 220.

Process 800 may include receiving information from a monitoring server (block 810). For example, prediction server 225 may receive information from monitoring server 220, as described with regard to FIG. 7. The information may be associated with one or more client devices 210.

Process 800 may include updating parameters (block 820). For example, prediction server 225 may update one or more parameter used to determine issues with client device 210 and/or used to resolve the issues associated with client device 210. Prediction server 225 may use the information received from multiple client devices 210 to update the parameter. Prediction server 225 may receive information relating to different types of issues (e.g., hard drive corruption, buffer overflows, etc.) and may assign a weight to each type of issue. The weight may be determined by using historical information (based on information associated with reports generated by monitoring server 220) that provides a pattern of instances associated with a type of issues. The weight may also be determined by the range of input values associated with a particular issue and/or the number of input values that are being used to derive the resolution associated with one or more issues with client device 210.

For example, assume that prediction server 225 stores historical information that over the last two years, 35% of failures of client devices 210 have been associated with hard drive corruption issues and 5% of failures of client devices 210 have been associated with memory leak threshold issues. In this case, prediction server 225 may allocate a greater weight to hard drive corruption issues than to memory leak threshold issues.

Process 800 may include sending updated parameters to a client device (block 830). For example, prediction server 225 may send updated parameters to monitoring application 215 on client device 210. Monitoring application 215 may receive the updated parameters and use the updated parameters to monitor for issues associated with client device 210 (described with regard to FIGS. 4 and 5).

Process 800 may include sending updated parameters to the monitoring server (block 840). For example, prediction server 225 may send updated parameters to monitoring server 220. The updated parameters sent to monitoring server 220 may be different than the updated parameters sent to client device 210 (described with regard to block 830). Monitoring server 220 may receive the updated parameters and use the updated parameters to determine the action (described with regard to FIG. 7) needed to be taken to resolve the issue with client device 210.

While a series of blocks has been described with regard to FIG. 8, the blocks and/or the order of the blocks may be modified in other implementations. Further, non-dependent blocks may be performed in parallel.

Figure 9:
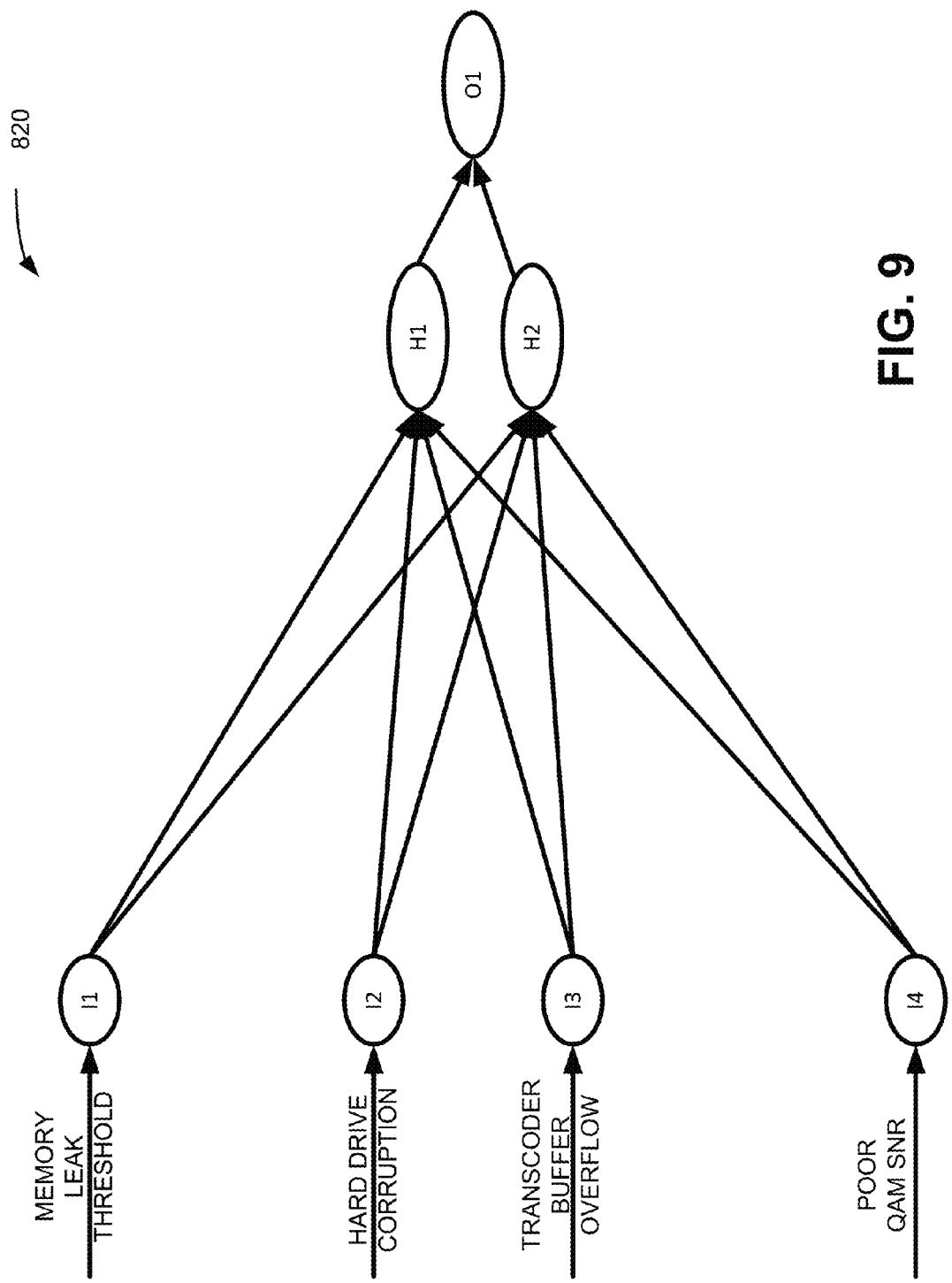
FIG. 9 is a diagram of an example process of generating an updated parameter.

FIG. 9 is diagram of an example process for taking multiple issues and generating an updated parameter for monitoring server 220, as described with regard to block 820. Assume that prediction server 225 receives four inputs (I1 to I4) that are associated with different issues associated with one or more client devices 210. As shown in FIG. 9, I1 is associated with a memory leak threshold issue, I2 is associated with a hard drive corruption issue, I3 is associated with a transcoder buffer overflow issue, and I4 is associated with a poor QAM SNR issue. Prediction server 225 may assign weights to each issue and combine the different issues into two intermediate nodes, H1 and H2. H1 and H2 may take the inputs (I1 to I4) and use algorithms to determine an output, O1. The algorithms may sum the inputs by using the different weights and using different mathematical processes, such as sigmoid, non-linear mathematical formulas, linear mathematical formulas, and/or other types of mathematical processes. The output O1 may be associated with resolving the issue with client device 210. For example, prediction server 225 may generate an output of shipping a new client device 210 to the user based on the inputs I1-I4.

Figure 10A:
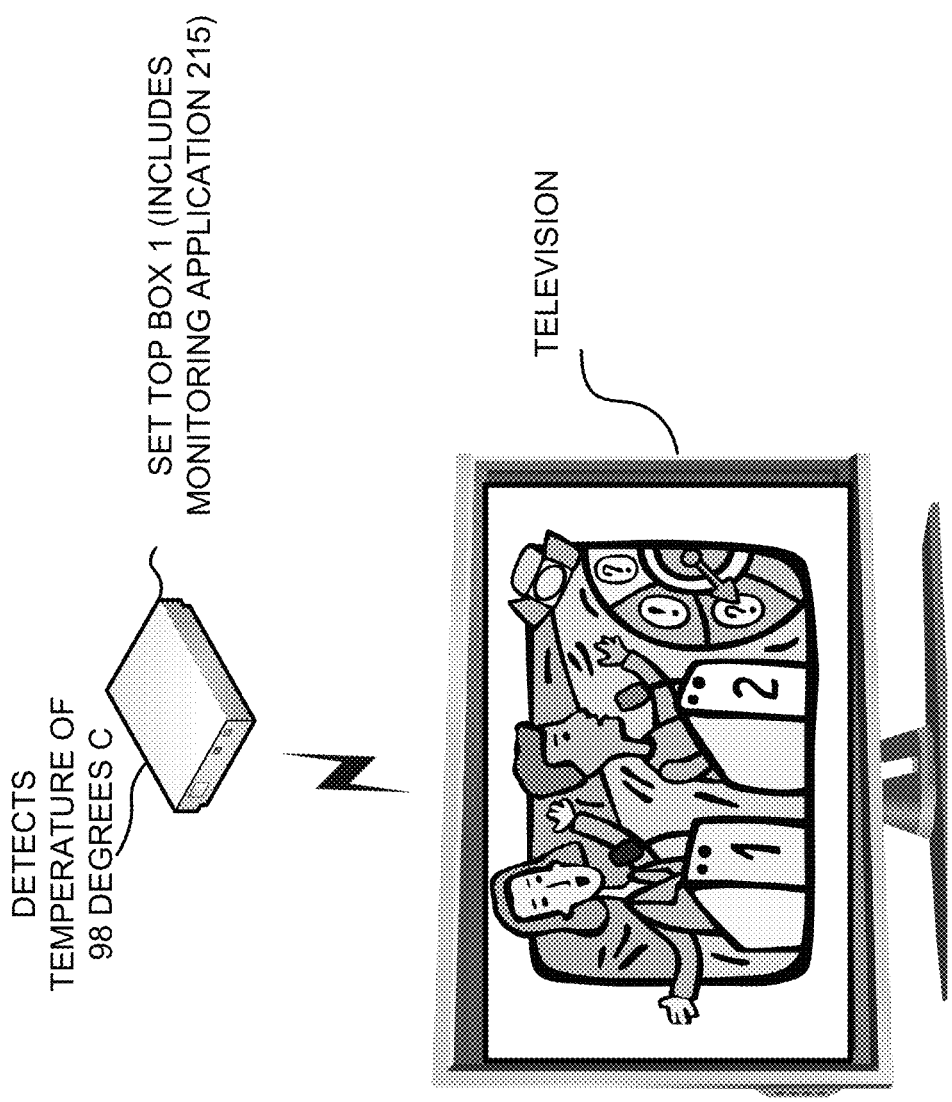
Figure 10B:
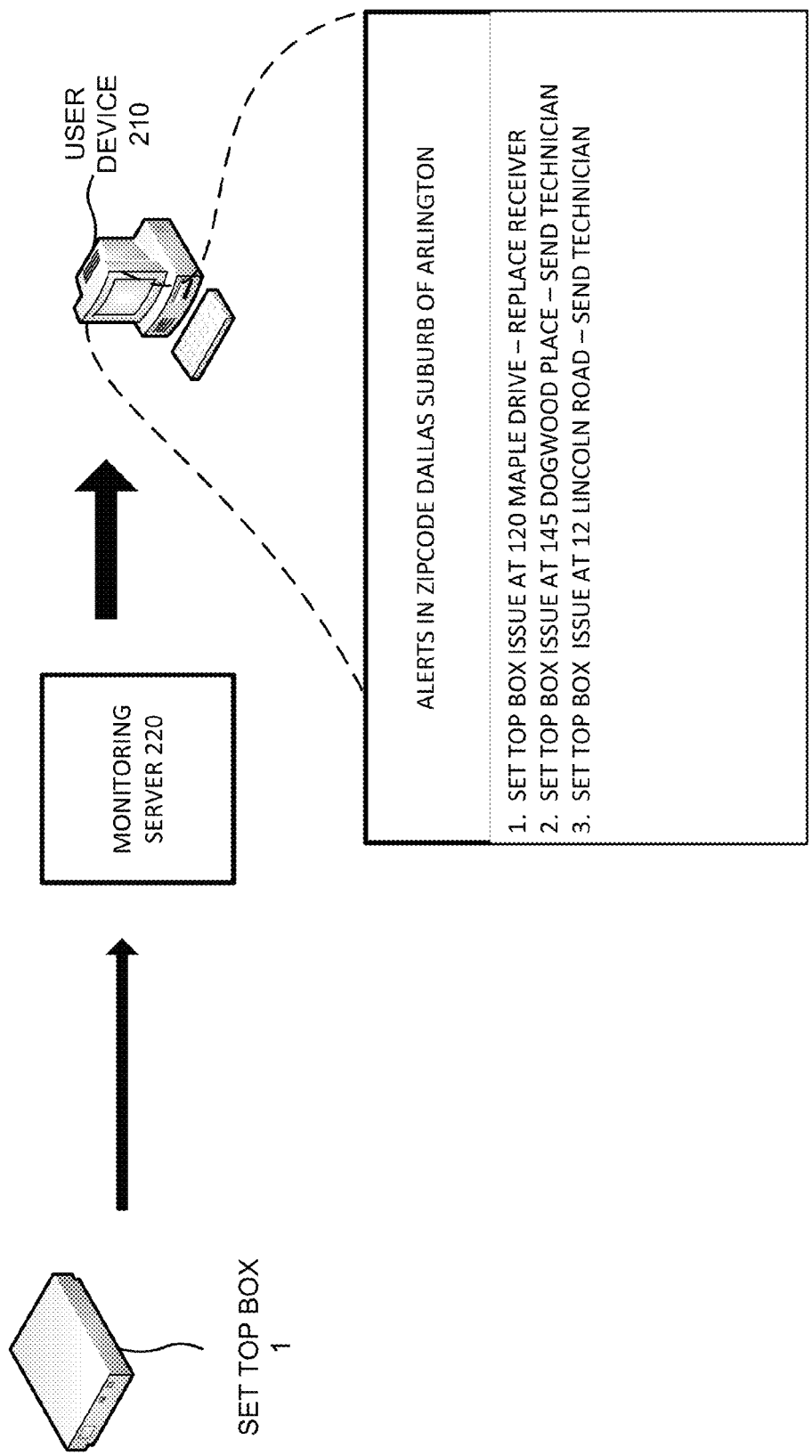

FIGS. 10A-10E are diagrams of example processes for detecting and resolving issues on a client device. FIG. 10A shows a set top box 1 and a television. Set-top box 1 may correspond to client device 210, described with regard to FIG. 2. Assume that set top box 1 may receives network services from a network service provider that permits set top box 1 to receive television programming content. As shown in FIG. 10A, set top box 1 may send television programming content to the television so that a user of set top box 1 can view the television programming. Monitoring application 215 (on set top box 1) may detect that the hard drive of set top box 1 has a temperature reading of 98 degrees Celsius associated with the hard drive of set top box 1 that has occurred for the last two days. Monitoring application 215 may determine that this temperature reading exceeds a maximum threshold temperature of 93 degrees Celsius. Monitoring application 215 may determine that there is an issue with the hard drive of set top box 1 and may send a notification to monitoring server 220, as shown in FIG. 10B.

Monitoring server 220 may receive the notification from set top box 1. Monitoring server 220 may determine, based on parameters and information stored by monitoring server 220, that a temperature reading of 98 degrees Celsius is an issue that leads to the failure of a set top box within 72 hours. Monitoring server 220 may have stored historical information based on failures of other set top boxes that had reached temperature readings of greater than 95 degrees Celsius.

Monitoring server 220 may determine that set top box 1 should be replaced with a new set top box. Monitoring server 220 may generate a report that includes issues with different set top boxes (including set top box 1) that have sent notifications to monitoring server 220. Monitoring server 220 may send the report to user device 230, as shown in FIG. 10B. Assume that set top box 1 is located at 120 Maple Drive (as shown on the display screen of user device 230). An employee of the network service provider may view the report on user device 230 and take the action indicated in the report (ship a new set top box). The user may communicate with a shipping company and have a new set top box sent to the user's residence, as shown in FIG. 10C.

Figure 10D:
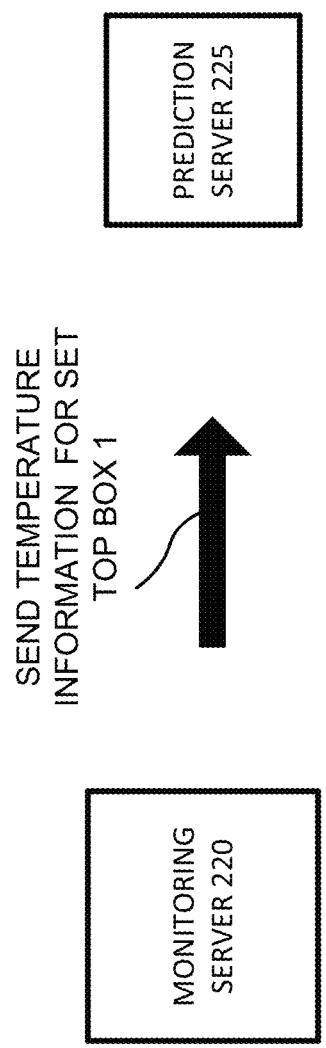
Figure 10E:
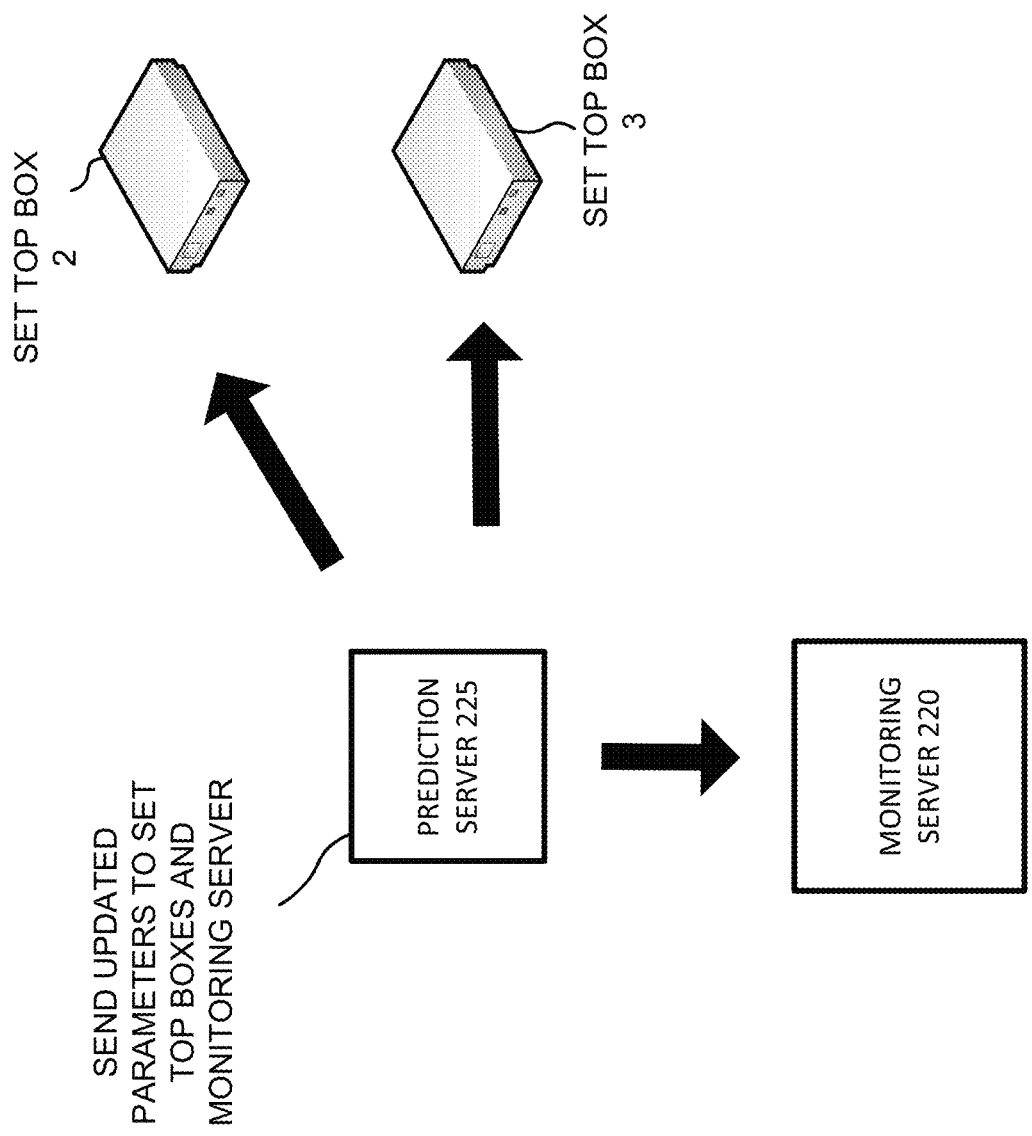

Additionally, monitoring server 220 may send the temperature information regarding the hard drive (from set top box 1) to prediction server 225, as shown in FIG. 10D. Prediction server 225 may receive the temperature information and may use the temperature information to update a parameter that is used by monitoring application 215 and monitoring server 220 to determine whether an issue exists with a set top box. Prediction server 225 may generate the updated parameter and send the updated parameter to monitoring server 220, set top box 2, and set top box 3, as shown in FIG. 10E. The updated parameter may have a threshold temperature level of 90 degrees Celsius instead of 93 degrees Celsius. Monitoring application 215, executing on both set top box 2 and set top box 3, may use the updated parameter to determine whether an issue exists within the respective set top box. Monitoring server 220 may use the updated parameter to determine that a new set top box be sent to a user when the temperature exceeds a threshold temperature of 90 degrees Celsius.

Systems and/or methods described herein may permit a monitoring application, executing on a client device (e.g., a set top box), to monitor a condition of a client device (and associated hardware, such as an ONT, BHR, a cable, etc.) by using a set of parameters stored by the monitoring application. Based on monitoring the condition of the client device, the monitoring application may detect issues (e.g., noisy video content being sent from the client device) that may cause the client device to fail or to function incorrectly (e.g., loss of audio, loss of video, etc.). As a result, issues associated with a client device may be detected and/or resolved, before the issue causes the client device to stop functioning.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   monitoring, by a client device, a condition of the client device based on a first threshold;
   detecting, by the client device and based on the first threshold, an issue associated with the client device based on monitoring the condition of the client device, the issue being associated with a failure of one or more client devices;
   sending, by the client device, information, regarding the issue, to a server,
      the server generating a parameter based on the information regarding the issue associated with the client device and information regarding at least one issue associated with at least one other client device of the one or more client devices;
   receiving, by the client device, the parameter from the server;
   updating, by the client device and based on receiving the parameter, the first threshold to a second threshold that is different from the first threshold; and
   monitoring, by the client device, the condition of the client device based on the second threshold.

2. The method of claim 1, where monitoring the condition of the client device based on the first threshold comprises:
   monitoring a connection between the client device and another device, based on the first threshold, to detect that the issue is associated with the connection, or
   monitoring the other device, based on the first threshold, to detect that the issue is associated with the other device;
   where detecting the issue associated with the client device comprises:
      detecting the issue associated with the connection or the other device; and where monitoring the condition of the client device based on the second threshold comprises:
monitoring the connection or the other device based on the second threshold.

3. The method of claim 1, where monitoring the condition of the client device based on the first threshold comprises at least one of:
monitoring a temperature of the client device based on the first threshold,
monitoring a signal-to-noise ratio value, based on the first threshold, associated with data being sent via a connection between the client device and another device, or
monitoring a buffer associated with the client device based on the first threshold; and
where monitoring the condition of the client device based on the second threshold comprises:
monitoring the temperature based on the second threshold,
monitoring the signal-to-noise ratio value based on the second threshold, or
monitoring the buffer based on the second threshold.

4. The method of claim 1, further comprising:
generating a message to instruct a user of the client device to perform an action to resolve the issue associated with the client device based on monitoring the client device based on the first threshold or the second threshold; and
outputting the message for display to the user of the client device.

5. The method of claim 4, where the message instructs the user of the client device to perform a reboot of the client device.

6. A non-transitory computer-readable medium storing instructions, the instructions comprising:
one or more instructions that, when executed by one or more processors of a client device, cause the one or more processors to:
monitor a condition of the client device based on a first threshold;
detect an issue associated with the client device based on monitoring the condition of the client device based on the first threshold;
send information, regarding the issue, to a server,
the server generating a parameter based on the information regarding the issue associated with the client device and information regarding at least one issue associated with at least one other client device;
receive the parameter from the server;
update, based on receiving the parameter, the first threshold to a second threshold that is different from the first threshold; and
monitor the condition of the client device based on the second threshold.

7. The non-transitory computer-readable medium of claim 6,
where the one or more instructions, that cause the one or more processors to monitor the condition of the client device based on the second threshold, cause the one or more processors to:
monitor a temperature of a component of the client device based on the second threshold.

8. The non-transitory computer-readable medium of claim 6,
where the one or more instructions, when executed by the one or more processors, further cause the one or more processors to:
determine that the client device has a capability to resolve the issue; and
resolve the issue based on determining that the client device has the capability to resolve the issue.

9. The non-transitory computer-readable medium of claim 8, where the one or more instructions, that cause the one or more processors to detect the issue associated with the client device, cause the one or more processors to:
detect that the issue is associated with another device connected to the client device.

10. The non-transitory computer-readable medium of claim 6, where the one or more instructions, that cause the one or more processors to monitor the condition of the client device based on the second threshold, cause the one or more processors to:
monitor a condition of another device, or a connection connecting the client device to the other device, based on the second threshold.

11. A system comprising:
a server to:
receive information regarding first issue, associated with a first client device, and a second issue associated with a second client device that is different from the first client device,
the information regarding the first issue being received based on a first threshold associated with monitoring the first client device;
analyze the information regarding the first issue and the second issue;
determine a second threshold, to be used to detect one or more issues associated with the first client device, based on analyzing the information regarding the first issue and the second issue,
the second threshold being different from the first threshold;
send information that identifies the second threshold to the first client device,
the first client device using the second threshold to detect the one or more issues associated with the first client device; and
send the information that identifies the second threshold to a monitoring server,
the monitoring server using the second threshold to determine one or more actions to be taken to resolve the one or more issues associated with the first client device.

12. The system of claim 11, where the server is further to:
send information that identifies the second threshold to the second client device.

13. A method comprising:
receiving, by a server, information regarding a first issue, associated with a first client device, and a second issue associated with a second client device that is different from the first client device,
the information regarding the first issue being received based on a first threshold associated with monitoring the first client device;
analyzing, by the server, the information regarding the first issue and the second issue;
determining, by the server, a second threshold, to be used to monitor a condition associated with the first client device, based on analyzing the information regarding the first issue and the second issue,
the second threshold being different from the first threshold;
sending, by the server, information that identifies the second threshold to the first client device,
the second threshold being used by the first client device in association with monitoring the condition of the first client device.

14. The method of claim 13, further comprising:
  storing information regarding a prior issue associated with the first client device or the second client device.
    the information regarding the prior issue being received before the information regarding the first issue and the second issue; and
  where analyzing the information regarding the first issue and the second issue comprises:
    using the stored information regarding the prior issues issue to analyze the first issue and the second issue.

15. The method of claim 13, where generating the second threshold comprises:
  assigning different weights to the first issue and the second issue to form a plurality of weighted issues;
  aggregating the plurality of weighted issues; and
  generating the second threshold based on aggregating the plurality of weighted issues.

16. The system of claim 11, where the server is further to:
  send information that identifies the second threshold to a third client device from which information regarding an issue was not received.

17. The system of claim 11, where the first issue and the second issue relate to different problems associated with the first client device and the second client device.

18. The system of claim 11, where the server, when determining the second threshold, is to:
  determine a first weight associated with the first issue;
  determine a second weight associated with the second issue; and
  determine the second threshold based on the first weight and the second weight.

19. The method of claim 13, where the first issue and the second issue relate to different problems associated with the first client device and the second client device.

20. The method of claim 13, further comprising:
  sending information that identifies the second threshold to a third client device from which information regarding an issue was not received.

* * * * *